(12) United States Patent
Shintani (10) Patent No.: US 10,310,784 B2
(45) Date of Patent: Jun. 4, 2019

(54) IMAGE FORMING APPARATUS AND AUTHENTICATION METHOD EXECUTED BY THE SAME

(71) Applicant: KYOCERA Document Solutions Inc., Osaka (JP)

(72) Inventor: Yoshihisa Shintani, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/997,221

(22) Filed: Jun. 4, 2018

(65) Prior Publication Data

US 2018/0349077 A1  Dec. 6, 2018

(30) Foreign Application Priority Data

Jun. 6, 2017 (JP) .................................. 2017-111601

(51) Int. Cl.
  *G06F 3/12* (2006.01)
  *G06F 21/31* (2013.01)
  *G06F 21/60* (2013.01)

(52) U.S. Cl.
  CPC .......... *G06F 3/1238* (2013.01); *G06F 3/1222* (2013.01); *G06F 3/1255* (2013.01); *G06F 21/31* (2013.01); *G06F 21/608* (2013.01)

(58) Field of Classification Search
  None
  See application file for complete search history.

(56) References Cited

U.S. PATENT DOCUMENTS

| 2004/0213615 A1* | 10/2004 | Nakao | G06F 21/608 |
| | | | 400/76 |
| 2016/0274833 A1* | 9/2016 | Mori | G06F 3/1204 |

FOREIGN PATENT DOCUMENTS

| EP | 2763073 A1 | 8/2014 |
| EP | 2770718 A1 | 8/2014 |
| JP | 2007-307736 A | 11/2007 |

OTHER PUBLICATIONS

Extended European Search Report issued by the European Patent Office dated Oct. 30, 2018, which corresponds to EP18175977.0-1218 and is related to U.S. Appl. No. 15/997,221.

* cited by examiner

*Primary Examiner* — Thomas D Lee
(74) *Attorney, Agent, or Firm* — Studebaker & Brackett PC (57) ABSTRACT

An image forming apparatus includes a touch panel, a first reception section, an extraction section, a second reception section, and a determining section. The first reception section receives a print job for a document from a personal computer. The extraction section extracts a first specific word from an updated portion in the document. The updated portion is specified by update history information. The second reception section receives input of a second specific word through the touch panel. The determining section determines whether or not to permit execution of the print job according to whether or not the second specific word matches the first specific word.

12 Claims, 8 Drawing Sheets

IMAGE FORMING APPARATUS AND AUTHENTICATION METHOD EXECUTED BY THE SAME

INCORPORATION BY REFERENCE

The present application claims priority under 35 U.S.C. § 119 to Japanese Patent Application No. 2017-111601, filed on Jun. 6, 2017. The contents of this application are incorporated herein by reference in their entirety.

BACKGROUND

The present disclosure relates to an image forming apparatus and an authentication method executed by the same.

An image forming apparatus includes a password generating section, a rule sending section, a recording section, an output section, and storage. The password generating section generates a password according to a given rule, using information included in a print job. The rule sending section sends the given rule to a transmission source terminal device that has sent the print job. The recording section records the print job in the storage in association with the password. The output section reads out the print job from the storage and executes the print job under a condition that the password is inputted.

SUMMARY

An image forming apparatus according to the present disclosure includes an operation panel, a first reception section, an extraction section, a second reception section, and a determining section. The first reception section receives a print job for a document from an external terminal device. The extraction section extracts a first specific word from an updated portion in the document. The updated portion is specified by update history information. The second reception section receives input of a second specific word through the operation panel. The determining section determines whether or not to permit execution of the print job according to whether or not the second specific word matches the first specific word.

An authentication method according to the present disclosure is for execution by an image forming apparatus including an operation panel. The authentication method includes primarily receiving, extracting, secondarily receiving, and determining. In the primarily receiving, a print job for a document is received from an external terminal device. In the extracting, a first specific word is extracted from an updated portion in the document. The updated portion is specified by update history information. In the secondarily receiving, input of a second specific word is received through the operation panel. In the determining, whether or not to permit execution of the print job is determined according to whether or not the second specific word matches the first specific word.

DETAILED DESCRIPTION

An embodiment of the present disclosure will be described as follows with reference to the drawings (FIGS. 1 to 8). It should be noted that elements in the drawings that are the same or equivalent are labelled using the same reference signs and description thereof is not repeated.

Figure 1:
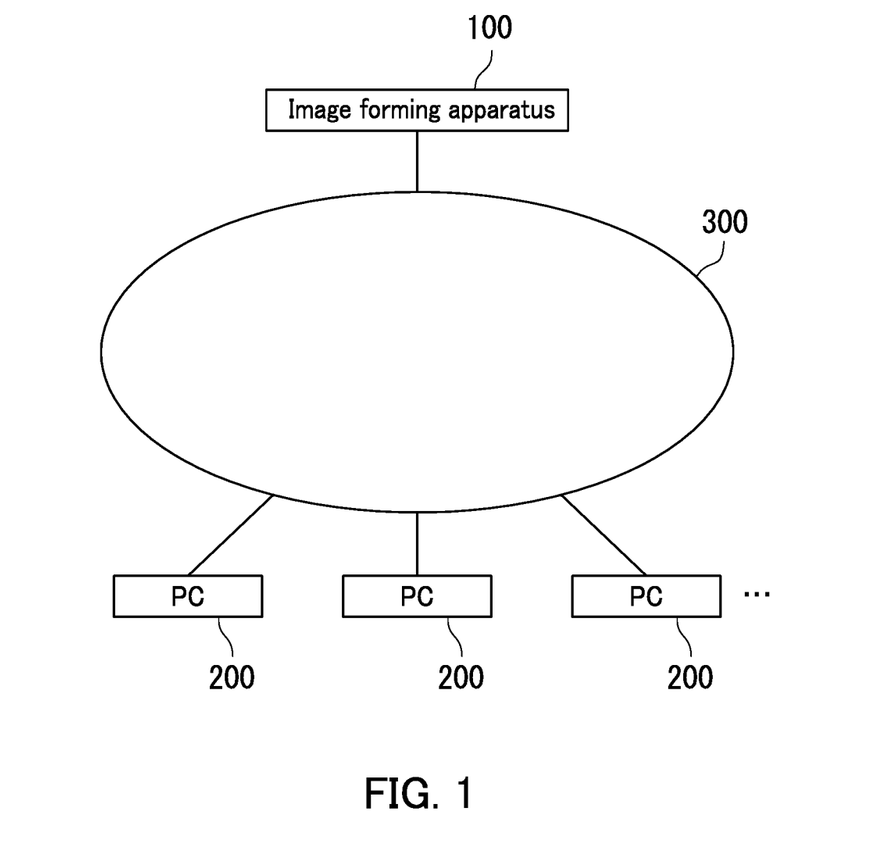
FIG. 1 is a diagram illustrating a situation in which an image forming apparatus is connected to personal computers according to an embodiment of the present disclosure.

First, a situation in which an image forming apparatus 100 is connected to personal computers 200 according to the embodiment of the present disclosure will be described with reference to FIG. 1. As illustrated in FIG. 1, the image forming apparatus 100 is communicatively connected to a plurality of the personal computers (PCs) 200 through a network 300.

The image forming apparatus 100 is a so-called multifunction peripheral, and includes a communication function. The image forming apparatus 100 exchanges various information with the personal computers 200 through the network 300.

Each personal computer 200 includes a communication function. A personal computer 200 is equivalent to an example of an "external terminal device". Because each of the personal computers 200 share the same unillustrated configuration, the personal computers 200 may be collectively referred to as the personal computer 200 in the following description.

The network 300 is the Internet, for example. The network 300 is not limited to the Internet. Other examples of the network 300 include a local area network (LAN) and a wide area network (WAN).

Figure 2:
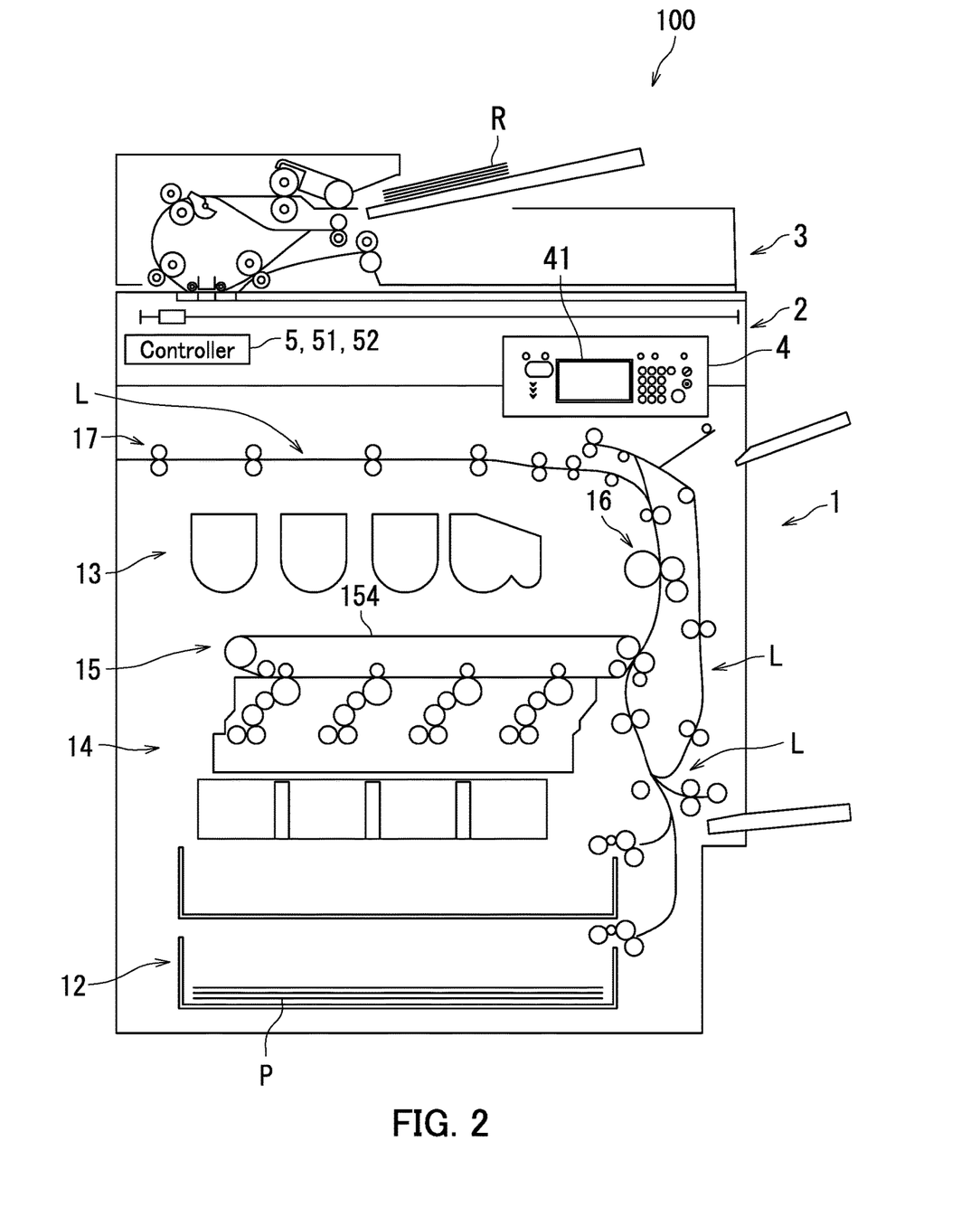
FIG. 2 is a diagram illustrating a configuration of the image forming apparatus according to the embodiment of the present disclosure.

Next, a configuration of the image forming apparatus 100 according to the present embodiment will be described with reference to FIGS. 1 and 2. FIG. 2 is a diagram illustrating the configuration of the image forming apparatus 100. The image forming apparatus 100 is a color multifunction peripheral. The image forming apparatus 100 reads an image from an original document R and forms an image on a sheet P using toner.

As illustrated in FIG. 2, the image forming apparatus 100 includes an image forming unit 1, an image reading unit 2, an original conveyance unit 3, an operation panel 4, and a controller 5. The image forming unit 1 forms an image on the sheet P. The image reading unit 2 reads an image from the original document R and generates image information. The original conveyance unit 3 conveys the original document R to the image reading unit 2. The operation panel 4 receives an operation from a user. The controller 5 controls operation of the image forming apparatus 100.

The image forming unit 1 includes a feeding section 12, a conveyance section L, a toner supply section 13, an image forming device 14, a fixing section 16, and an ejection section 17. The image forming device 14 includes a transfer section 15.

The feeding section 12 feeds the sheet P to the conveyance section L. The conveyance section L conveys the sheet P to the ejection section 17 through the transfer section 15 and the fixing section 16.

The toner supply section 13 supplies toner to the image forming device 14. The image forming device 14 forms an image on the sheet P.

The transfer section 15 includes an intermediate transfer belt 154. The image forming device 14 transfers cyan, magenta, yellow, and black toner images on to the intermediate transfer belt 154. The color toner images are superimposed on the intermediate transfer belt 154 to form an image on the intermediate transfer belt 154. The transfer section 15 transfers the image formed on the intermediate transfer belt 154 to the sheet P. As a result, the image is formed on the sheet P.

The fixing section 16 applies heat and pressure to the sheet P to fix the image formed on the sheet P to the sheet P. The ejection section 17 ejects the sheet P out of the image forming apparatus 100.

The operation panel 4 includes a touch panel 41. The touch panel 41 includes a liquid crystal display (LCD) for example, and displays various images. The touch panel 41 also includes a touch sensor and receives an operation from the user. The touch panel 41 has a rectangular shape.

The controller 5 includes a processor 51 and storage 52. The processor 51 includes a central processing unit (CPU), for example. The storage 52 includes memory such as semiconductor memory, and may include a hard disk drive (HDD). The storage 52 stores a control program.

Figure 3:
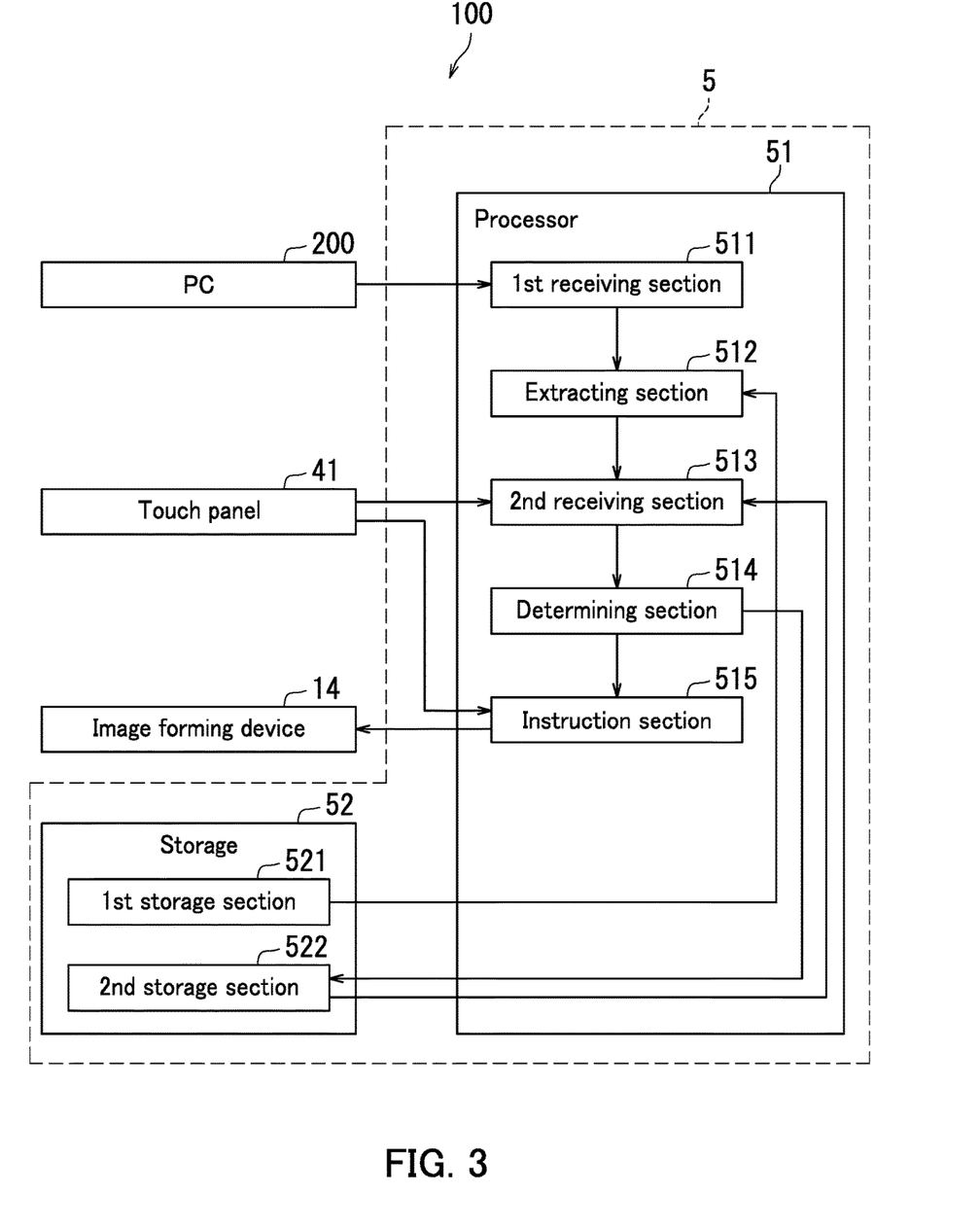
FIG. 3 is a diagram illustrating a configuration of a controller according to the embodiment of the present disclosure.

Next, a configuration of the controller 5 according to the embodiment of the present disclosure will be described with reference to FIGS. 1 to 3. FIG. 3 is a diagram illustrating the configuration of the controller 5.

As illustrated in FIG. 3, the processor 51 includes a first reception section 511, an extraction section 512, a second reception section 513, a determining section 514, and an instruction section 515. Specifically, the processor 51 functions as the first reception section 511, the extraction section 512, the second reception section 513, the determining section 514, and the instruction section 515 by executing the control program. The storage 52 includes a first storage section 521 and a second storage section 522.

The first storage section 521 stores one or more prohibited words WX. A prohibited word WX means a word that is not appropriate as a first specific word W1 used for user authentication. The extraction section 512 is prohibited from extracting a prohibited word WX from a document DM as the first specific word W1. For example, a prohibited word WX means a word that can be easily guessed by another person.

Specifically, the prohibited words WX include at least one of the following: a word included in a header of the document DM, a word included in a footer of the document DM, and a word exhibiting a version of the document DM. The prohibited words WX also include at least one of the following: a word exhibiting a number of a diagram recorded in the document DM, a word exhibiting a number of a table recorded in the document DM, a word included in a title recorded in the document DM, and a word included in a table of contents recorded in the document DM.

The second storage section 522 stores one or more frequent words WF. A frequent word WF means a word that is received by the second reception section 513 at least a predetermined number of times as a second specific word W2. The predetermined number of times is 10, for example.

The first reception section 511 receives a print job JB for the document DM from a personal computer 200.

The extraction section 512 extracts the first specific word W1 from an updated portion in the document DM. The updated portion is specified by update history information. The updated portion means a portion that the user has updated.

Also, the extraction section 512 does not extract a prohibited word WX as the first specific word W1 from the document DM. Furthermore, the extraction section 512 extracts the first specific word W1 fulfilling a predetermined extraction condition from the document DM. The extraction condition will be described with reference to FIG. 6B.

The second reception section 513 receives input of the second specific word W2 through the touch panel 41.

The determining section 514 determines whether or not to permit execution of the print job JB according to whether or not the second specific word W2 matches the first specific word W1. Specifically, the determining section 514 determines to permit the execution of the print job JB when the second specific word W2 matches the first specific word W1. The determining section 514 determines not to permit the execution of the print job JB when the second specific word W2 does not match the first specific word W1. The second specific word W2 matching the first specific word W1 indicates that the user authentication is successful. The second specific word W2 not matching the first specific word W1 indicates that the user authentication has failed.

The instruction section 515 executes the print job JB through the image forming device 14 when the determining section 514 has determined to permit the execution of the print job JB.

According to the embodiment of the present disclosure as described above with reference to FIGS. 1 to 3, the extraction section 512 extracts the first specific word W1 from the updated portion in the document DM. The updated portion is specified by the update history information. The second reception section 513 receives input of the second specific word W2 through the touch panel 41. The determining section 514 determines whether or not to permit execution of the print job JB according to whether or not the second specific word W2 matches the first specific word W1. The user remembers the first specific word W1 because the first specific word W1 is included in a portion of the document DM that the user has recently updated. Therefore, the user can easily guess the first specific word W1. Accordingly, the print job JB can be executed by inputting the second specific word W2 even when a password has been forgotten. As a result, convenience for the user can be increased.

The extraction section 512 does not extract a prohibited word WX from the document DM as the first specific word W1. Therefore, a suitable first specific word W1 can be extracted by setting the prohibited words WX to words that are inappropriate as the first specific word W1.

Figure 4:
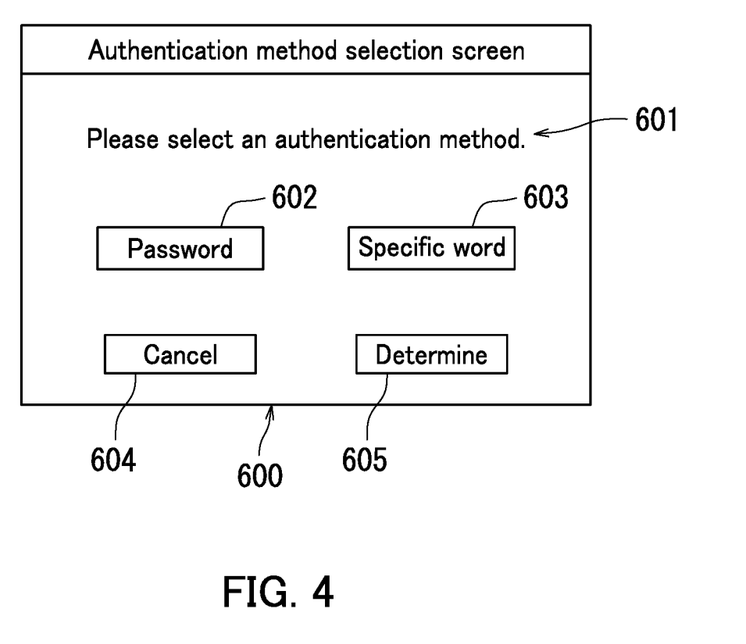
FIG. 4 is a screen diagram illustrating an example of an authentication method selection screen displayed on a touch panel.

Next, the configuration of the controller 5 will be further described with reference to FIGS. 2 to 4. FIG. 4 is a screen diagram illustrating an example of an authentication method selection screen 600 displayed on the touch panel 41. The second reception section 513 displays the authentication method selection screen 600 on the touch panel 41. As illustrated in FIG. 4, the authentication method selection screen 600 includes a guidance display section 601, a password button 602, a specific word button 603, a cancel button 604, and a determination button 605.

The guidance display section 601 displays guidance information to the user. Specifically, the guidance display section 601 displays a character string: "Please select an authentication method". According to the guidance information, the user selects a user authentication method to execute the print job JB on the image forming apparatus 100. The user authentication method includes a first method and a second method. The first method means a method in which a password is inputted. The second method means a method in which the second specific word W2 is inputted.

The user touches the password button 602 when selecting the first method as the user authentication method. The first method is put in a selected state by the user touching the password button 602.

The user touches the specific word button 603 when selecting the second method as the user authentication method. The second method is put in a selected state by the user touching the specific word button 603.

The user touches the cancel button 604 when cancelling the selected state of the user authentication method. The selected state of the user authentication method is cancelled by the user touching the cancel button 604.

The user touches the determination button 605 when confirming the user authentication method in the selected state. The user authentication method in the selected state is confirmed by the user touching the determination button 605. For example, when the user has touched the specific word button 603 to put the second method in the selected state, the user authentication method is determined to be the second method by the user touching the determination button 605.

The second reception section 513 determines the user authentication method through the authentication method selection screen 600.

According to the embodiment of the present disclosure as described above with reference to FIGS. 2 to 4, the user can select the first method or the second method as the user authentication method. For example, the user can select a method in which the second specific word W2 is inputted (the second method) when the user has forgotten the password. Accordingly, the convenience for the user can be further increased.

Figure 5A:
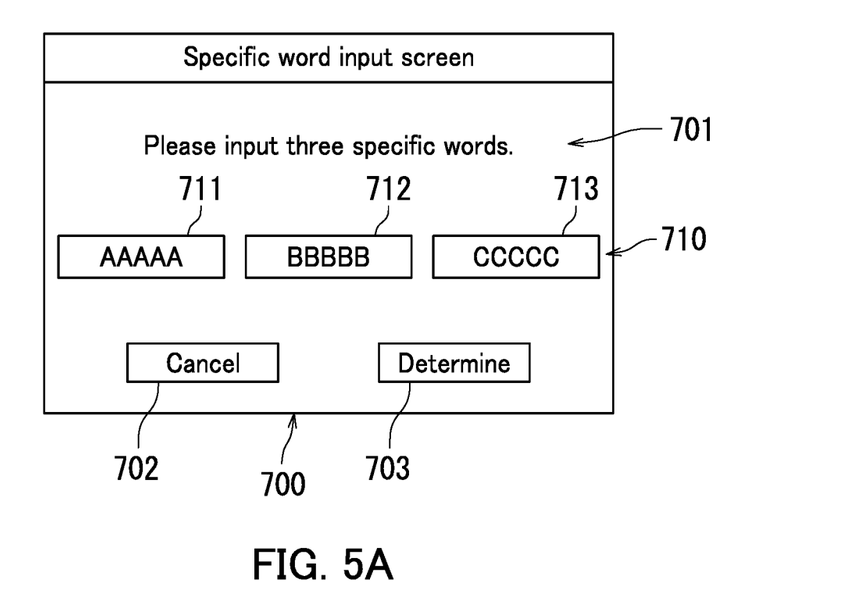
FIG. 5A is a screen diagram illustrating an example of a specific word input screen displayed on the touch panel.

Next, a specific configuration of the extraction section 512, the second reception section 513, and the determining section 514 will be described with reference to FIGS. 2 to 5A. FIG. 5A is a screen diagram illustrating an example of a specific word input screen 700 displayed on the touch panel 41. The specific word input screen 700 is displayed on the touch panel 41 by the second reception section 513.

As illustrated in FIG. 5A, the specific word input screen 700 includes a guidance display section 701, a specific word input section 710, a cancel button 702, and a determination button 703. According to the embodiment of the present disclosure, a case is described in which the second reception section 513 receives three second specific words W2.

The guidance display section 701 displays guidance information to the user. Specifically, the guidance display section 701 displays a character string: "Please input three specific words". According to the guidance information, the user inputs three second specific words W2 to execute the print job JB on the image forming apparatus 100.

The three second specific words W2 are inputted to the specific word input section 710. The specific word input section 710 includes a first input section 711, a second input section 712, and a third input section 713. One of the second specific words W2 is inputted to each of the first input section 711, the second input section 712, and the third input section 713. The second reception section 513 displays a software keyboard on the touch panel 41 when the user has touched any of the first input section 711, the second input section 712, and the third input section 713. The user inputs the second specific words W2 through the software keyboard.

For example, a character string "AAAAA" is inputted as a second specific word W2 to the first input section 711. Also, a character string "BBBBB" is inputted as a second specific word W2 to the second input section 712. A character string "CCCCC" is inputted as a second specific word W2 to the third input section 713.

The user touches the cancel button 702 when cancelling the second specific words W2 inputted to the first input section 711, the second input section 712, and the third input section 713. The second specific words W2 inputted to the first input section 711, the second input section 712, and the third input section 713 are cancelled by the user touching the cancel button 702. As a result, the second specific words W2 inputted to the first input section 711, the second input section 712, and the third input section 713 are deleted.

The user touches the determination button 703 when confirming the three character strings inputted to the first input section 711, the second input section 712, and the third input section 713 as the second specific words W2. The three character strings ("AAAAA", "BBBBB", and "CCCCC") are confirmed as the three second specific words W2 by the user touching the determination button 703.

As described with reference to FIG. 5A, the second reception section 513 specifically performs the following process. The second reception section 513 receives input of a second number N2 of the second specific words W2. The second number N2 is at least two and at most equal to a first number N1. According to the embodiment of the present disclosure, the second number N2 is three.

The extraction section 512 and the determining section 514 specifically perform the following process. The extraction section 512 extracts a first number N1 of first specific words W1. The first number N1 is at least two, and for example is five.

The determining section 514 determines whether or not to permit the execution of the print job JB according to whether or not each of the second number N2 of the second specific words W2 matches any of the first number N1 of the first specific words W1. For example, the determining section 514 determines whether or not to permit the execution of the print job JB according to whether or not each of the three second specific words W2 matches any of the five first specific words W1. Specifically, the determining section 514 permits the execution of the print job JB when each of the three second specific words W2 matches any of the five first specific words W1. When at least one of the three second specific words W2 does not match any of the five first specific words W1, the determining section 514 does not permit the execution of the print job JB. Each of the three second specific words W2 matching any of the five first specific words W1 indicates that the user authentication is successful. At least one of the three second specific words W2 not matching any of the five first specific words W1 indicates that the user authentication has failed.

According to the embodiment of the present disclosure as described above with reference to FIGS. 2 to 5A, the extraction section 512 extracts the first number N1 of the first specific words W1. The second reception section 513 receives input of the second number N2 of the second specific words W2. The determining section 514 determines whether or not to permit the execution of the print job JB according to whether or not each of the second number N2 of the second specific words W2 matches any of the first number N1 of the first specific words W1. Therefore, the print job JB can be easily executed while protecting security by setting the first number N1 and the second number N2 to suitable quantities. Accordingly, the convenience for the user can be further increased.

Also, for example, the first number N1 is preferably more than one even when the second number N2 is one. The extraction section 512 extracts a plurality of the first specific words W1 when the first number N1 is more than one. As such, the determining section 514 determines whether or not to permit the execution of the print job JB according to whether or not the second specific word W2 matches any of the first specific words W1. Therefore, the second specific word W2 is easily matched to a first specific word W1. Accordingly, the print job JB can be easily executed by inputting the second specific word W2 even when the password has been forgotten.

Note that according to the embodiment of the present disclosure, the first number N1 is five. However, the first number N1 need only be equal to or greater than the second number N2. The possibility that the second specific words W2 will match any of the first specific words W1 increases as the first number N1 increases. By contrast, the processing performed by the extraction section 512 can be further simplified as the first number N1 decreases.

Furthermore, according to the embodiment of the present disclosure, the second number N2 is three. However, the second number N2 may be one, two, four, or greater. The security can be further strengthened as the second number N2 increases. A burden of inputting the second specific words W2 on the user can be lessened as the second number N2 decreases.

Figure 5B:
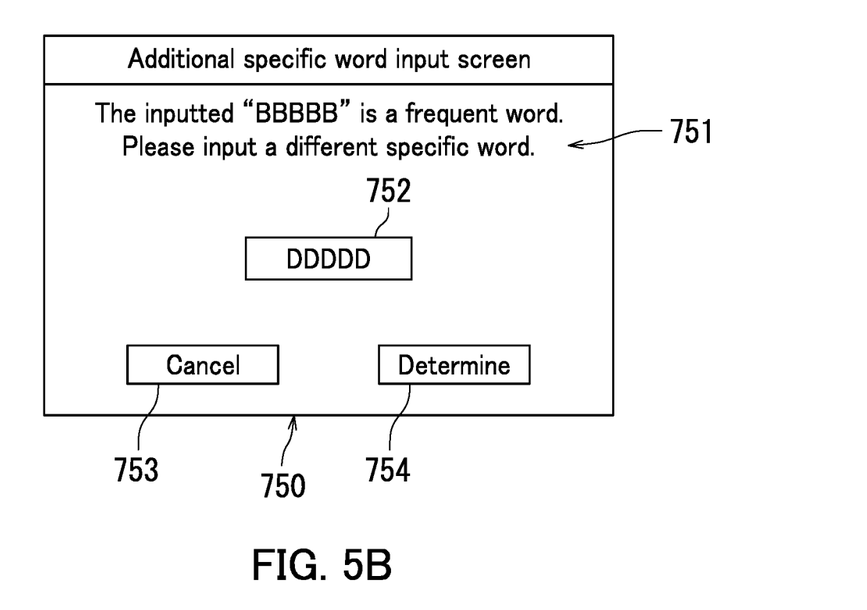
FIG. 5B is a screen diagram illustrating an example of an additional specific word input screen displayed on the touch panel.

Next, a specific configuration of the determining section 514 relating to processing of the frequent words WF will be described with reference to FIGS. 2 to 5B. FIG. 5B is a screen diagram illustrating an example of an additional specific word input screen 750 displayed on the touch panel 41. The additional specific word input screen 750 is displayed on the touch panel 41 by the second reception section 513. The additional specific word input screen 750 includes a guidance display section 751, a specific word input section 752, a cancel button 753, and a determination button 754. According to the embodiment of the present disclosure, a case is described in which the second reception section 513 receives an addition of one second specific word W2.

The guidance display section 751 displays guidance information to the user. Specifically, the guidance display section 751 displays a character string: "The inputted 'BBBBB' is a frequent word. Please input a different specific word". The guidance information is displayed through the following process.

First, the determining section 514 determines that one second specific word W2 of the three second specific words W2 inputted by the user in the specific word input screen 700 is a frequent word WF. Note that the second specific word W2 determined to be a frequent word WF by the determining section 514 exhibits a character string "BBBBB". Next, the user is prompted to additionally input a different second specific word W2 than the three second specific words W2 inputted through the specific word input screen 700 illustrated in FIG. 5A because the determining section 514 has determined that one of the second specific words W2 is a frequent word WF.

One second specific word W2 is inputted to the specific word input section 752. When the user has touched the specific word input section 752, the second reception section 513 displays a software keyboard on the touch panel 41. The user inputs the second specific word W2 through the software keyboard.

For example, a character string "DDDDD" is inputted to the specific word input section 752 as the second specific word W2.

The user touches the cancel button 753 when cancelling the second specific word W2 inputted to the specific word input section 752. The second specific word W2 inputted to the specific word input section 752 is cancelled by the user touching the cancel button 753. As a result, the second specific word W2 inputted to the specific word input section 752 is deleted.

The user touches the determination button 754 when confirming the second specific word W2 inputted to the specific word input section 752. The one specific word W2 inputted to the specific word input section 752 is confirmed by the user touching the determination button 754. For example, the added second specific word W2 is determined to be the character string: "DDDDD".

As described with reference to FIG. 5A, the determining section 514 specifically performs the following process. The determining section 514 determines whether or not the second specific word W2 received by the second reception section 513 matches a frequent word WF. According to the embodiment of the present disclosure, the determining section 514 determines whether or not each of the three second specific words W2 received by the second reception section 513 match any frequent words WF. One or more frequent words WF are stored in the second storage section 522. According to the embodiment of the present disclosure, a case is described in which one second specific word W2 of the three second specific words W2 matches a frequent word WF.

Furthermore, the determining section 514 determines whether or not the second reception section 513 has received a given word as a second specific word W2 at least a predetermined number of times through the specific word input screen 700 or the additional specific word input screen 750. When the determining section 514 determines that the given word has been received at least the predetermined number of times, the determining section 514 determines that the given word is a frequent word WF. As such, the determining section 514 stores the given word in the second storage section 522 as a frequent word WF.

When the determining section 514 has determined that the second specific word W2 matches a frequent word WF, the second reception section 513 displays the additional specific word input screen 750 to receive another second specific word W2.

When the second specific word W2 received by the second reception section 513 through the additional specific word input screen 750 does not match a frequent word WF but matches one of the first specific words W1, the determining section 514 permits the execution of the print job JB.

According to the embodiment of the present disclosure as described above with reference to FIGS. 2 to 5B, the second reception section 513 receives another second specific word W2 when a second specific word W2 matches a frequent word WF. A frequent word WF means a word that has been received as a second specific word W2 at least a predetermined number of times (ten times, for example). Therefore, it is not preferable to use a frequent word WF as a second specific word W2 for determining whether or not to permit the execution of the print job JB. Accordingly, the second specific word W2 can be limited to suitable words.

The determining section 514 determines that a given word is a frequent word WF when the second reception section 513 has received the given word as a second specific word W2 at least a predetermined number of times, and stores the given word in the second storage section 522. Therefore, a frequent word WF can be added according to the second specific word W2 inputted by the user. Accordingly, the second specific word W2 can be limited to more suitable words.

Figure 6A:
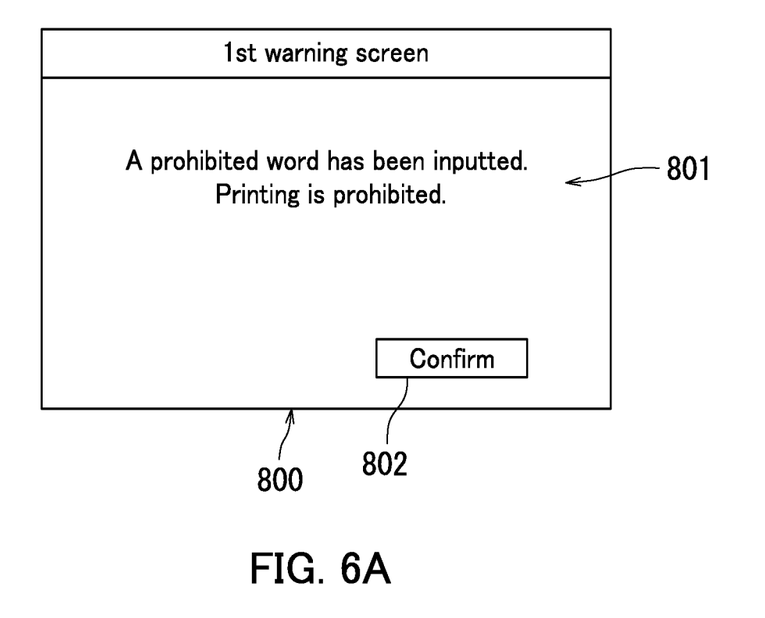
FIG. 6A is a screen diagram illustrating an example of a first warning screen displayed on the touch panel.

Next, a specific configuration of the determining section 514 relating to processing of the prohibited words WX will be described with reference to FIGS. 2 to 6A. FIG. 6A is a screen diagram illustrating an example of a first warning screen 800 displayed on the touch panel 41. The determining section 514 displays the first warning screen 800 on the touch panel 41. The first warning screen 800 includes a guidance display section 801 and a confirmation button 802.

The guidance display section 801 displays guidance information to the user. Specifically, the guidance display section 801 displays a character string: "A prohibited word has been inputted. Printing is prohibited". The guidance information is displayed through the following process.

First, the determining section 514 determines that at least one second specific word W2 of the three second specific words W2 inputted by the user in the specific word input screen 700 is a prohibited word WX. Next, the determining section 514 prohibits the execution of the print job JB because the determining section 514 has determined at least one of the second specific words W2 is a prohibited word WX.

The user touches the confirmation button 802 when clearing the first warning screen 800. The first warning screen 800 is cleared by the user touching the confirmation button 802.

One or more prohibited words WX are stored in the first storage section 521. The determining section 514 also determines whether or not each of the second specific words W2 matches a prohibited word WX. As such, the determining section 514 displays the first warning screen 800 on the touch panel 41 and prohibits the execution of the print job JB when the determining section 514 has determined that a second specific word W2 matches a prohibited word WX.

According to the embodiment of the present disclosure as described above with reference to FIGS. 2 to 6A, the determining section 514 prohibits the execution of the print job JB when a second specific word W2 matches a prohibited word WX. Also, a prohibited word WX means a word that can be easily guessed by another person, for example. Accordingly, the security can be strengthened.

Figure 6B:
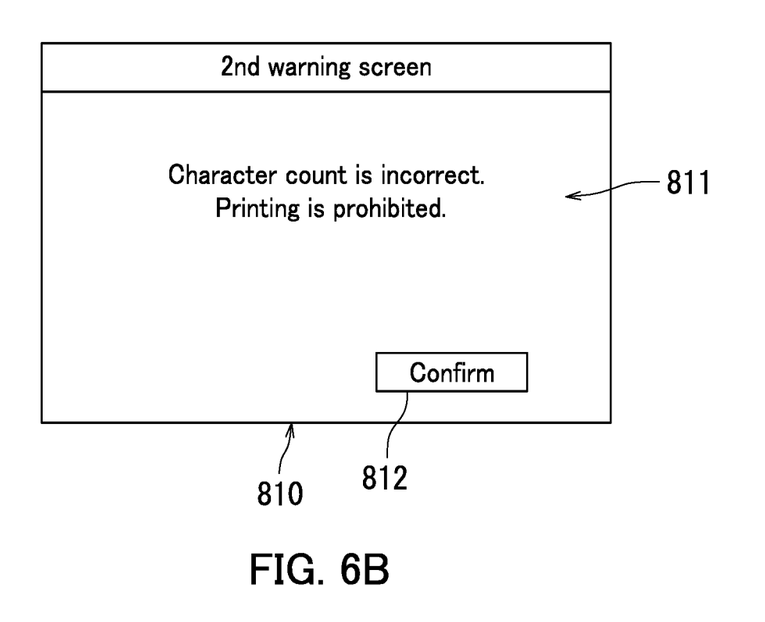
FIG. 6B is a screen diagram illustrating an example of a second warning screen displayed on the touch panel.

Next, a specific configuration of the determining section 514 relating to processing of a character count NC2 will be further described with reference to FIGS. 2 to 6B. The character count NC2 is equivalent to a "number of characters". FIG. 6B is a screen diagram illustrating an example of a second warning screen 810 displayed on the touch panel 41. The determining section 514 displays the second warning screen 810 on the touch panel 41. The second warning screen 810 includes a guidance display section 811 and a confirmation button 812.

The guidance display section 811 displays guidance information to the user. Specifically, the guidance display section 811 displays a character string: "Character count is incorrect. Printing is prohibited". The guidance information is displayed through the following process.

First, the determining section 514 determines that the character count NC2 of at least one second specific word W2 of the three second specific words W2 inputted by the user in the specific word input screen 700 is less than a predetermined character count NCA. The predetermined character count NCA is equivalent to a "predetermined number of characters". Next, the determining section 514 prohibits the execution of the print job JB because the determining section 514 has determined that the character count NC2 of the second specific word W2 is less than the predetermined character count NCA.

The user touches the confirmation button 812 when clearing the second warning screen 810. The second warning screen 810 is cleared by the user touching the confirmation button 812.

As described with reference to FIG. 6B, the determining section 514 specifically performs the following process. The determining section 514 determines whether or not the character count NC2 of each of the second specific words W2 is less than the predetermined character count NCA. When the determining section 514 has determined that the character count NC2 of a second specific word W2 is less than the predetermined character count NCA, the determining section 514 displays the second warning screen 810 on the touch panel 41 and prohibits the execution of the print job JB.

The extraction section 512 specifically performs the following process. The extraction section 512 extracts a first specific word W1 fulfilling a predetermined extraction condition from the document DM. The extraction condition includes a character count NC1 of the first specific word W1 being at least the predetermined character count NCA. The character count NC1 is equivalent to a "number of characters".

According to the embodiment of the present disclosure as described above with reference to FIGS. 2 to 6B, the extraction section 512 extracts the first specific word W1 fulfilling the predetermined extraction condition from the document DM. The extraction condition includes the character count NC1 of the first specific word W1 being at least the predetermined character count NCA. Therefore, the print job JB can be easily executed while protecting the security by setting the predetermined character count NCA to a suitable value. Accordingly, the convenience for the user can be further increased.

When the character count NC2 of the second specific word W2 is less than the predetermined character count NCA, the determining section 514 prohibits the execution of the print job JB. Also, when the character count NC2 of the second specific word W2 is less than the predetermined character count NCA, it is possible that another person has inputted the second specific word W2. Accordingly, the security can be further strengthened.

Note that according to the embodiment of the present disclosure, the extraction condition includes the character count NC1 of the first specific word W1 being at least the predetermined character count NCA. However, the present disclosure is not limited thereto. For example, the extraction condition may indicate that the first specific word W1 may include a word and punctuation marks located before or after the word. For example, a character count of a word fulfilling the predetermined character count NCA is seven characters when the predetermined character count NCA indicates eight characters and a punctuation mark located before or after the word indicates one character. Therefore, the character count of the word included in the first specific word W1 decreases when the first specific word W1 includes punctuation marks before or after the word. Accordingly, the extraction section 512 can easily extract the first specific word W1.

For example, a case is described in which the following sentence is included in the updated portion of the document DM.

"'I was a little crazy. But I wasn't crazy in any complicated manner. I didn't confuse you did I, darling?' 'Wine is a grand thing,'I said. 'It makes you forget all the bad.'"

When the extraction condition indicates that the first specific word W1 is composed of only a word, and the predetermined character count NCA indicates eight characters, the extraction section 512 extracts "complicated" as a first specific word W1 from the above sentence. By contrast, when the extraction condition indicates that the first specific word W1 may include a word and punctuation marks located before or after the word, and the predetermined character count NCA indicates eight characters, "darling?'" is also extracted as a first specific word W1 from the above sentence. Accordingly, the extraction section 512 can easily extract the first specific word W1.

Figure 7:
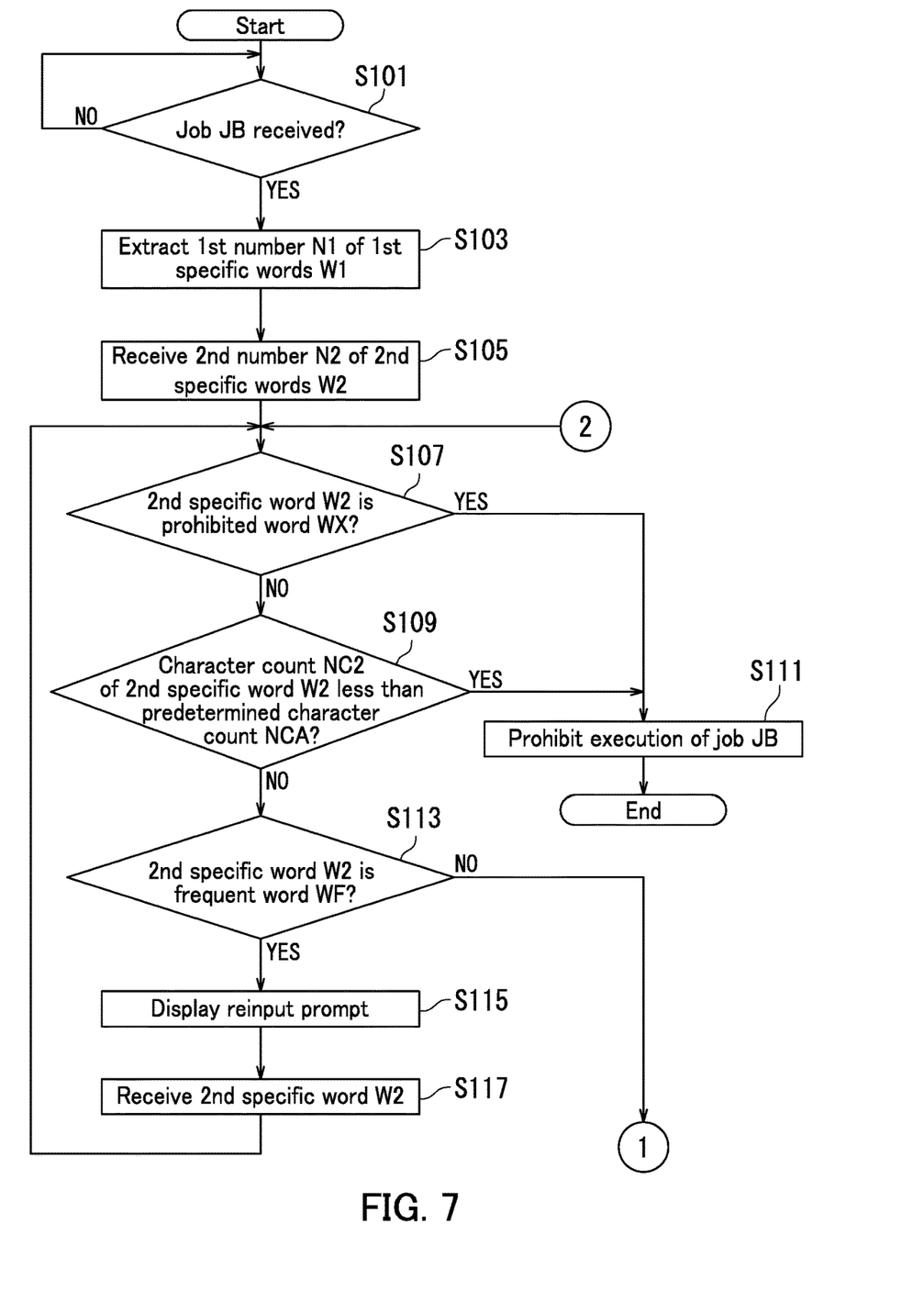
FIG. 7 is a flowchart illustrating an example of a process by the controller.
Figure 8:
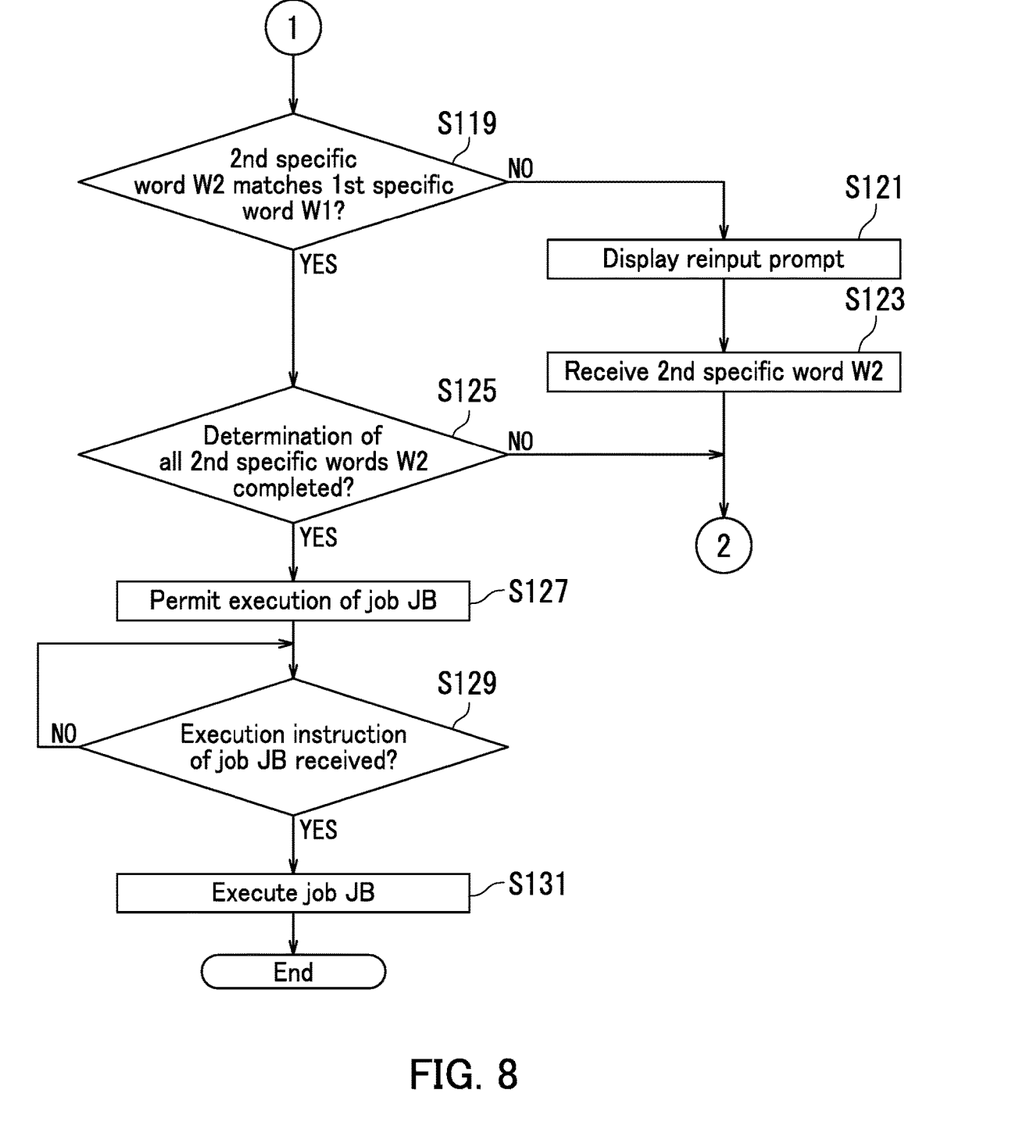
FIG. 8 is a flowchart further illustrating the example of the process by the controller.

Next, a process by the controller 5 will be described with reference to FIGS. 1 to 8. FIGS. 7 and 8 are flowcharts illustrating an example of the process by the controller 5.

First, as described with reference to FIG. 7, the first reception section 511 determines whether or not the print job JB for the document DM has been received from a personal computer 200 in Step S101.

When the first reception section 511 determines that the print job JB for the document DM has not been received (NO in Step S101), the process enters a standby state. When the first reception section 511 determines that the print job JB for the document DM has been received (YES in Step S101), the process advances to Step S103.

Then, in Step S103, the extraction section 512 extracts five first specific words W1 from the updated portion in the document DM. The updated portion is specified by the update history information.

Next, the second reception section 513 receives input of three second specific words W2 in Step S105.

Next, the determining section 514 determines whether or not any of the second specific words W2 is a prohibited word WX in Step S107.

When the determining section 514 determines that any of the second specific words W2 is a prohibited word WX (YES in Step S107), the process advances to Step S111. When the determining section 514 determines that none of the second specific words W2 is a prohibited word WX (NO in Step S107), the process advances to Step S109.

Then, in Step S109, the determining section 514 determines whether or not the character count NC2 of any of the second specific words W2 is less than four characters.

When the determining section 514 determines that the character count NC2 is less than four characters (YES in Step S109), the process advances to Step S111.

Then, in Step S111, the determining section 514 displays the first warning screen 800 illustrated in FIG. 6A or the second warning screen 810 illustrated in FIG. 6B on the touch panel 41, and prohibits the execution of the print job JB. The process then ends.

When the determining section 514 determines that the character count NC2 is not less than four characters (NO in Step S109), the process advances to Step S113.

Then, in Step S113, the determining section 514 determines whether or not any of the second specific words W2 is a frequent word WF.

When the determining section 514 determines that none of the second specific words W2 is a frequent word WF (NO in Step S113), the process advances to Step S119 in FIG. 8. When the determining section 514 determines that any of the second specific words W2 is a frequent word WF (YES in Step S113), the process advances to Step S115.

Then, in Step S115, the second reception section 513 displays a reinput prompt for a second specific word W2 on the touch panel 41. Specifically, the second reception section 513 displays the additional specific word input screen 750 illustrated in FIG. 5B on the touch panel 41.

Next, in Step S117, the second reception section 513 receives the second specific word W2 through the additional specific word input screen 750, and the process returns to Step S107.

When NO in Step S113, the determining section 514 determines whether or not each of the second specific words W2 matches any of the first specific words W1 in Step S119 as illustrated in FIG. 8.

When the determining section 514 determines that each of the second specific words W2 matches any of the first number N1 of the first specific words W1 (YES in Step S119), the process advances to Step S125. When the determining section 514 determines that any of the second specific words W2 does not match any of the first number N1 of the first specific words W1 (NO in Step S119), the process advances to Step S121.

Then, in Step S121, the second reception section 513 displays a reinput prompt for a second specific word W2 on the touch panel 41.

Next, in Step S123, the second reception section 513 receives the second specific word W2 and the process returns to Step S107 illustrated in FIG. 7.

When YES in Step S119, the determining section 514 determines whether or not the determination of all of the second specific words W2 has completed in Step S125. Specifically, the determining section 514 determines whether or not the determination of the second number N2 of the second specific words W2 has completed.

When the determining section 514 determines that the determination of all of the second specific words W2 has not completed (NO in Step S125), the process returns to Step S107 illustrated in FIG. 7. When the determining section 514 determines that the determination of all of the second specific words W2 has completed (YES in Step S125), the process advances to Step S127.

Then, in Step S127, the determining section 514 permits the execution of the print job JB.

Next, in Step S129, the instruction section 515 determines whether or not an instruction to execute the print job JB has been received.

When the instruction section 515 determines that the instruction to execute the print job JB has not been received (NO in Step S129), the process enters a standby state. When the instruction section 515 determines that the instruction to execute the print job JB has been received (YES in Step S129), the process advances to Step S131.

Then, in Step S131, the instruction section 515 executes the print job JB through the image forming device 14, and the process ends.

Step S101 is equivalent to an example of "primarily receiving". Step S103 is equivalent to an example of "extracting". Step S105 is equivalent to an example of "secondarily receiving". Step S119 is equivalent to an example of "determining".

According to the embodiment of the present disclosure as described above with reference to FIGS. 1 to 8, the second reception section 513 receives input of another second specific word W2 when the determining section 514 determines that the second specific word W2 does not match a first specific word W1. Therefore, the user can execute the print job JB by inputting another second specific word W2. Accordingly, the convenience for the user can be further increased.

An embodiment of the present disclosure has been described above with reference to the drawings. However, the present disclosure is not limited to the above-described embodiments and can be practiced in various ways within the scope without departing from the essence of the present disclosure (as illustrated below in (1) to (4), for example). The drawings schematically illustrate elements of configuration in order to facilitate understanding and properties of elements of configuration illustrated in the drawings, such as thickness, length, and number thereof, may differ from actual properties thereof in order to facilitate preparation of the drawings. Furthermore, properties of elements of configuration described in the above embodiments, such as shapes and dimensions, are merely examples and are not intended as specific limitations. Various alterations are possible so long as there is no substantial deviation from the configuration of the present disclosure.

(1) According to the embodiment of the present disclosure as described with reference to FIG. 1, the "external terminal device" is the personal computer 200. However, the present disclosure is not limited thereto. The external terminal device need only be communicatively connected to the image forming apparatus 100. Other examples of the external terminal device include a smartphone and a tablet terminal device.

(2) According to the embodiment of the present disclosure described with reference to FIGS. 1 to 3, the second reception section 513 receives the second specific word W2 from the touch panel 41. However, the present disclosure is not limited thereto. The second reception section 513 need only receive the second specific word W2 from the operation panel 4. For example, the second reception section 513 may receive the second specific word W2 through hard keys arranged on the operation panel 4.

(3) According to the present disclosure as described with reference to FIGS. 2 to 5A, the second reception section 513 receives input of three second specific words W2. However, the present disclosure is not limited thereto. The second reception section 513 may receive input of any number of second specific words W2. The second reception section 513 may receive input of one second specific word W2 or two second specific words W2. Furthermore, the second reception section 513 may receive input of three or more second specific words W2. As the number of second specific words W2 (second number N2) received by the second reception section 513 increases, the security can be further strengthened.

(4) According to the embodiment of the present disclosure as described with reference to FIGS. 2 to 5A, the determining section 514 determines whether or not each of the second number N2 of the second specific words W2 matches any of the first number N1 of the first specific words W1. However, the present disclosure is not limited thereto. The determining section 514 may further determine whether or not an inputted order of the second number N2 of the second specific words W2 fulfills a predetermined order. The predetermined order, for example, indicates an order of proximity to the beginning of the document DM. In such a case, the execution of the print job JB cannot be permitted unless the inputted order of the second number N2 of the second specific words W2 fulfills the predetermined order. Accordingly, the security can be further strengthened.

What is claimed is:

1. An image forming apparatus in which an authentication method for executing a print job is selected, the authentication method including a first method and a second method, the first method being a method in which a password is inputted, and the second method being a method in which a second specific word is inputted, the image forming apparatus comprising:
    an operation panel; and
    a controller, wherein
    the controller includes a processor and storage,
    the storage stores a control program therein,
    the processor functions as a first reception section, an extraction section, a second reception section, and a determining section through execution of the control program,
    the first reception section receives a print job for a document from an external terminal device,
    the extraction section extracts a first specific word from an updated portion in the document, the updated portion being specified by update history information,
    the second reception section receives input of the second specific word through the operation panel,
    the determining section determines whether or not to permit execution of the print job according to whether or not the second specific word matches the first specific word, and
    when the determining section determines to permit the execution of the print job, the image forming apparatus executes the print job.

2. The image forming apparatus according to claim 1, wherein
    the extraction section extracts a plurality of the first specific words, and
    the determining section determines whether or not to permit the execution of the print job according to whether or not the second specific word matches any of the first specific words.

3. The image forming apparatus according to claim 1, wherein
    the extraction section extracts a first number of the first specific words, the first number being equal to or greater than two,
    the second reception section receives input of a second number of the second specific words,
    the second number is equal to or less than the first number and at least two, and
    the determining section determines whether or not to permit the execution of the print job according to whether or not each of the second number of the second specific words matches any of the first number of the first specific words.

4. The image forming apparatus according to claim 1, wherein
    the extraction section extracts the first specific word fulfilling a predetermined extraction condition from the document, and
    the predetermined extraction condition includes a number of characters of the first specific word being at least a predetermined number of characters.

5. The image forming apparatus according to claim 4, wherein
the determining section prohibits the execution of the print job when a number of characters of the second specific word is less than the predetermined number of characters.

6. The image forming apparatus according to claim 1, wherein
the extraction section extracts the first specific word fulfilling a predetermined extraction condition,
the predetermined extraction condition indicates that the first specific word may include a word and one or more marks located either or both before and after the word, and
the one or more marks include punctuation marks.

7. The image forming apparatus according to claim 1, further comprising:
a first storage section configured to store a prohibited word, wherein
the prohibited word means a word that is inappropriate as the first specific word, and
the extraction section does not extract the prohibited word from the document as the first specific word.

8. The image forming apparatus according to claim 7, wherein
the prohibited word includes at least one of a word included in a header of the document, a word included in a footer of the document, and a word exhibiting a version of the document.

9. The image forming apparatus according to claim 7, wherein
the determining section prohibits the execution of the print job when the second specific word matches the prohibited word.

10. The image forming apparatus according to claim 1, further comprising:
a second storage section configured to store a frequent word, wherein
the frequent word means a word that is received as the second specific word by the second reception section at least a predetermined number of times, and
the determining section determines that a given word is the frequent word when the second reception section has received the given word as the second specific word at least the predetermined number of times, and stores the given word in the second storage section.

11. The image forming apparatus according to claim 10, wherein
when the second specific word matches the frequent word, the second reception section receives input of another second specific word.

12. An authentication method for execution by an image forming apparatus including an operation panel, the authentication method including a first method and a second method, the first method being a method in which a password is inputted, and the second method being a method in which a second specific word is inputted, the authentication method comprising:
primarily receiving a print job for a document from an external terminal device;
extracting a first specific word from an updated portion in the document, the updated portion being specified by update history information and indicating a portion of the document that has been updated by a user;
secondarily receiving input of the second specific word through the operation panel;
determining whether or not to permit execution of the print job according to whether or not the second specific word matches the first specific word; and
executing the print job when the execution of the print job is determined to be permitted.

\* \* \* \* \*